Oct. 4, 1927.
R. T. GRIFFITHS
1,644,122
METHOD OF MANUFACTURING SEAMED HOLLOW RUBBER ARTICLES
Filed March 22, 1926
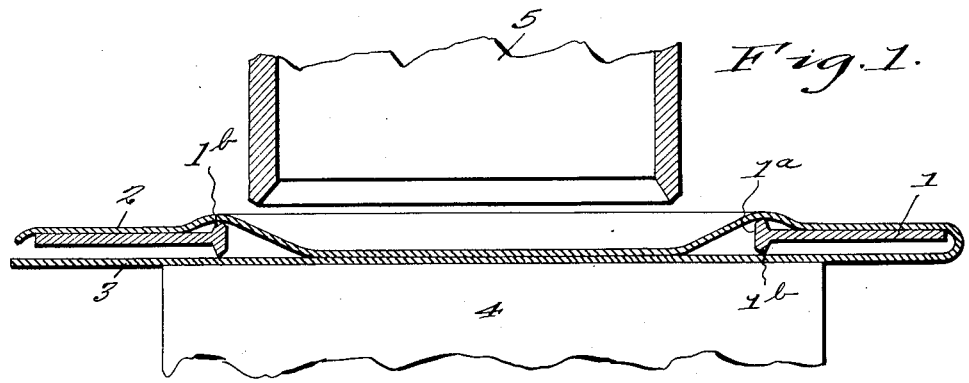
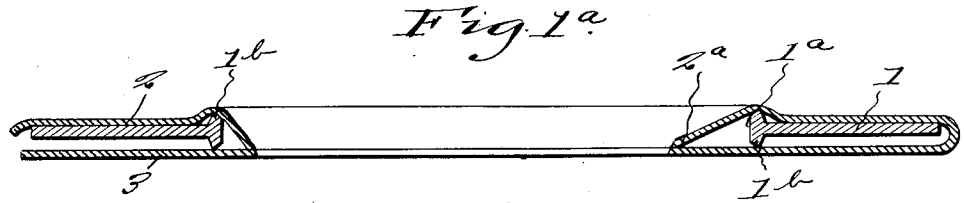
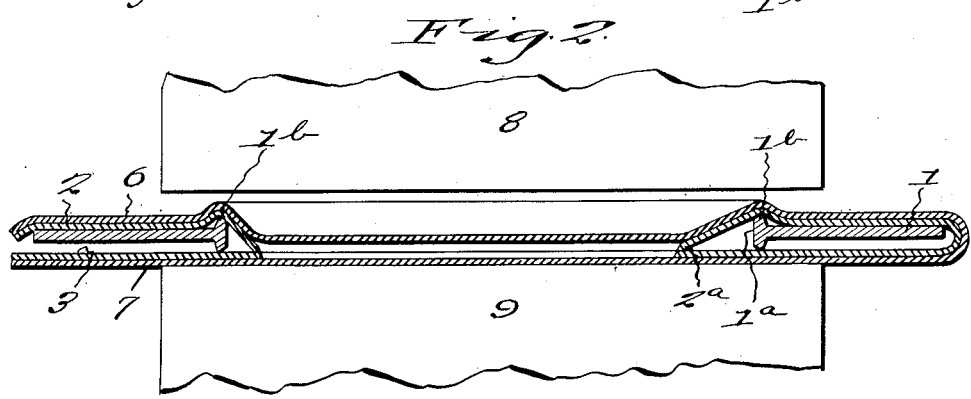
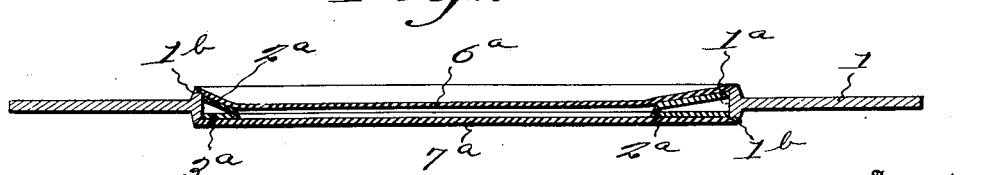
Inventor
Richard T. Griffiths
By *[signature]*
Attorney Patented Oct. 4, 1927.

1,644,122

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

METHOD OF MANUFACTURING SEAMED HOLLOW RUBBER ARTICLES.

Application filed March 22, 1926. Serial No. 96,604.

My said invention relates to a new process or method of forming hollow articles of rubber, which are designed to be inflated, and is adapted more particularly for the production of toy animals, though not limited in its application to any specific article or articles.

The invention also relates to an improved combined die and platen member particularly adapted for the carrying out of such process.

Heretofore, so far as I am aware, it has been customary to form articles of this character by cutting out and seaming together two duplicate sheets of uncured rubber of the outline of the desired article which, after vulcanization, is inflated. An article so made has a single median seam and when inflated has an approximately elliptical cross section, or one which is relatively narrow as to its height and length, and with a median ridge, unless subjected to undue internal pressure.

My invention aims to provide a process and means by which a relatively wide and thick article can be secured and, if desired, one in which the width may be increased relative to its height or length, to any desired extent and one in which also, the width at different points may be varied according to the nature of the article, as for example, legs or arms may be made with a width materially less than the body, etc.

The invention includes the novel method and means hereinafter described and defined by the appended claims.

In order that the invention may be better understood reference is made to the accompanying drawing, in which:—

Figure 1 is a vertical section through the platen and its assembled rubber sheets and die and anvil, and illustrating the first stage in my method.

Fig. 1ª is a similar view at the close of the first cutting and seaming operation.

Fig. 2 is a similar view showing the cutting and seaming mandrel with its superposed sheets and coacting platens at the beginning of the second stage.

Fig. 2ª is a similar view at the close of the second stage.

In proceeding according to my improved process or method, I provide a relatively thin platen member 1 having a central opening 1ª, the platen being provided on its opposite faces adjacent said opening with continuous cutting and seaming members or flanges 1ᵇ. This member 1 I place between two layers 2 and 3 of uncured rubber, which sheets may be independent, or may be a single sheet folded to embrace the platen or form, as shown. The member 1 with its applied layers, is then placed on an anvil or other suitable support 4 and a combined cutting and seaming die 5 is brought down on the topmost layer with sufficient force to depress this layer into contact with the lower layer and press the same against the anvil, whereby the portions of the layers lying within the edge of the die are severed and the edges lying outside of the severed portion are joined together, this being effected by the shape of the blunt cutting die shown in the drawings, and in a manner which will be well understood by those skilled in the art.

The cutting and seaming die 5 is of less width or diameter at all points than the diameter of the opening in the member 1 and by its action the severed edges of the sheets 2 and 3 are joined together in a seam 2ª which is located a suitable distance from the edge of the opening in the member 1, which distance may be different at different points, as illustrated respectively at the right and left in Figs. 1 and 1ª. Having thus severed and removed a portion of the layers lying within the die and seamed together the edges of the remaining portions of the layers, I apply to the upper and lower faces of said layers additional layers 6 and 7, which may likewise be done by applying separate sheets or by folding a single sheet. Before applying the layers 6 and 7 the surfaces of the sheets may be dusted with sulphur or other suitable material to prevent adhesion.

The platen member 1 with its assembled layers is then placed in a press comprising upper and lower plane faced members 8 and 9 which are brought together with sufficient force to cause the cutting and seaming ribs or flanges 1ᵇ coacting with the plane faces of members 8 and 9, to sever the assembled layers, the portions of the layers 2, 3, 6 and 7 lying outside of the ribs 1ᵇ being removed and scrapped, and the edges of the portions lying inside of said ribs being seamed together. Thereafter the article may be removed and vulcanized in the ordinary or any desired manner, being provided with an inflating valve (not shown) by which it may be inflated after vulcanization.

The opening 1ª in the member 1 is made of the shape of the desired article, and the sheet portions 6ª and 7ª form the opposite sides of the article, while the sheet portions 2ª and 3ª collectively, form, when the article is inflated, a peripheral band lying between the two sides and connecting them at their margins, and which band arrangement hereinbefore described can be made of any desired width for any particular portion or portions.

In carrying out my process I prefer to apply the layers 2—3 and 6—7 by folding single sheets to produce the two layers, as shown in the drawings.

By making the plate 1 of square external outline and producing the successive layers by rolling the plate in a single strip or sheet of rubber, I am assured that the position of the layers relative to the plate opening is undisturbed.

Having thus described my invention, what I claim is:—

The hereindescribed method of forming hollow rubber articles which consists in folding a sheet of uncured rubber to embrace a relatively thin ring and to provide a layer overlying each opposite face of the ring, the ring having oppositely facing endless cutting and seaming ribs conforming in contour to the shape of the desired article, simultaneously severing the portions of the sheets lying inside of the ring on lines spaced from said cutting and seaming ribs, and seaming the edges together, folding an additional sheet of uncured rubber to embrace the covered ring and to provide an additional layer overlying the outer face of the remaining portion of each original layer, and subjecting the assembled layers to the pressure of opposing press members whereby the said cutting and seaming ribs will sever and simultaneously join the inner and outer layers.

In testimony whereof, I affix my signature.

RICHARD T. GRIFFITHS.